United States Patent
Brown et al.

(10) Patent No.: US 11,066,493 B2
(45) Date of Patent: Jul. 20, 2021

(54) CATALYST INJECTION SYSTEM FOR AN OLEFIN POLYMERIZATION REACTOR

(71) Applicant: NOVA Chemicals (International) S.A., Fribourg (CH)

(72) Inventors: Stephen Brown, Calgary (CA); Eric Clavelle, Calgary (CA); Geoffrey Harding, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 170 days.

(21) Appl. No.: 16/451,585

(22) Filed: Jun. 25, 2019

(65) Prior Publication Data

US 2020/0055969 A1 Feb. 20, 2020

(30) Foreign Application Priority Data

Jun. 26, 2018 (CA) .............................. CA 3009299

(51) Int. Cl.
| | | |
|---|---|---|
| *C08F 10/02* | (2006.01) | |
| *B01J 8/00* | (2006.01) | |
| *B01J 19/18* | (2006.01) | |
| *C08F 2/06* | (2006.01) | |

(52) U.S. Cl.
CPC ............. *C08F 10/02* (2013.01); *B01J 8/0015* (2013.01); *B01J 19/18* (2013.01); *B01J 2208/00769* (2013.01)

(58) Field of Classification Search
USPC ............................ 526/88, 919; 422/131, 310
See application file for complete search history.

(56) References Cited

U.S. PATENT DOCUMENTS

| | | | |
|---|---|---|---|
| 4,543,399 | A | 9/1985 | Jenkins, III et al. |
| 4,588,790 | A | 5/1986 | Jenkins, III et al. |
| 4,701,432 | A | 10/1987 | Welborn, Jr. |
| 4,808,561 | A | 2/1989 | Welborn, Jr. |
| 4,882,406 | A | 11/1989 | Cozewith et al. |
| 4,935,397 | A | 6/1990 | Chang |
| 4,937,301 | A | 6/1990 | Chang |
| 5,028,670 | A | 7/1991 | Chinh et al. |
| 5,057,475 | A | 10/1991 | Canich et al. |

(Continued)

FOREIGN PATENT DOCUMENTS

EP 0 279 153 B1 3/1994

OTHER PUBLICATIONS

ASTM D 1238-04; Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D 1238-01. pp. 1-13.

*Primary Examiner* — Fred M Teskin (74) *Attorney, Agent, or Firm* — Foley & Lardner LLP (57) ABSTRACT

This disclosure relates to a method and an apparatus for the delivery of a multi-component olefin polymerization catalyst to a polymerization reactor. The components soluble in a first solvent are delivered under pressure along with that solvent in a first delivery conduit. The components that are insoluble in the first solvent but are soluble in a second solvent are delivered under pressure in a second delivery conduit which is arranged coaxially with and disposed within the first conduit, such that the inner conduit and outer conduit terminate at a common catalyst component mixing conduit which extends into the polymerization reactor and in which the catalyst components mix to form an active polymerization catalyst.

32 Claims, 1 Drawing Sheet

(56) References Cited

U.S. PATENT DOCUMENTS

| | | |
|---|---|---|
| 5,064,802 A | 11/1991 | Stevens et al. |
| 5,096,867 A | 3/1992 | Canich |
| 5,132,380 A | 7/1992 | Stevens et al. |
| 5,198,401 A | 3/1993 | Turner et al. |
| 5,324,800 A | 6/1994 | Welborn, Jr. et al. |
| 5,352,749 A | 10/1994 | DeChellis et al. |
| 5,405,922 A | 4/1995 | DeChellis et al. |
| 5,633,394 A | 5/1997 | Welborn, Jr. et al. |
| 5,703,187 A | 12/1997 | Timmers et al. |
| 6,002,033 A | 12/1999 | Razavi et al. |
| 6,034,021 A | 3/2000 | Wilson et al. |
| 6,063,879 A | 5/2000 | Stephan et al. |
| 6,235,672 B1 | 5/2001 | McKay et al. |
| 6,277,931 B1 | 8/2001 | Jaber et al. |
| 6,342,463 B1 | 1/2002 | Stephan et al. |
| 6,372,864 B1 | 4/2002 | Brown |
| 6,777,508 B1 | 8/2004 | Parodi et al. |
| 6,777,509 B2 | 8/2004 | Brown et al. |
| 6,789,413 B2 | 9/2004 | Brazeau et al. |
| 6,956,094 B2 | 10/2005 | Mawson et al. |
| 6,984,695 B2 | 1/2006 | Brown et al. |
| 8,431,657 B2 | 4/2013 | Wang et al. |
| 2004/0052690 A1 | 3/2004 | Eaton et al. |
| 2010/0041841 A1 | 2/2010 | Terry et al. |
| 2016/0108185 A1 | 4/2016 | Wang et al. |
| 2016/0108222 A1 | 4/2016 | Sibtain et al. |
| 2016/0229964 A1 | 8/2016 | Bellehumeur et al. |
| 2017/0044357 A1 | 2/2017 | Wang et al. |

CATALYST INJECTION SYSTEM FOR AN OLEFIN POLYMERIZATION REACTOR

CROSS REFERENCE TO RELATED APPLICATIONS

This application claims the benefit of the earlier filing date of Canadian application serial number 3009299 filed on Jun. 26, 2018. The contents of Canadian application serial number 3009299 are incorporated herein by reference in their entirety.

TECHNICAL FIELD

This disclosure relates to a method and an apparatus for the delivery of a multi-component olefin polymerization catalyst to a polymerization reactor.

BACKGROUND

Solution polymerization processes are generally carried out at temperatures above the melting point of the ethylene homopolymer or copolymer product being made. In a typical solution polymerization process, catalyst components, solvent, monomers and hydrogen are fed under pressure to one or more reactors. For ethylene polymerization, or ethylene copolymerization, reactor temperatures can range from about 80° C. to about 300° C. while pressures generally range from about 3 MPag to about 45 MPag. In solution polymerization, the ethylene homopolymer or copolymer produced remains dissolved in the solvent under reactor conditions. The residence time of the solvent in the reactor is relatively short, for example, from about 1 second to about 20 minutes. The solution process can be operated under a wide range of process conditions that allow the production of a wide variety of ethylene polymers.

SUMMARY

Embodiments of this disclosure include a method and apparatus for the delivery of a multi-component olefin polymerization catalyst to a polymerization reactor.

An embodiment of the disclosure is a method for delivering a multi-component olefin polymerization catalyst to a polymerization reactor, the method comprising: feeding at least one catalyst component soluble in a first solvent to a catalyst component mixing conduit via a first catalyst component delivery conduit; feeding at least one catalyst component soluble in a second solvent to the catalyst component mixing conduit via a second catalyst component delivery conduit which is disposed within the first catalyst component delivery conduit; wherein the at least one catalyst component soluble in the first solvent and the at least one catalyst component soluble in the second solvent come into contact with one another within the catalyst component mixing conduit to form an active polymerization catalyst before being expelled from the catalyst component mixing conduit into the polymerization reactor.

In an embodiment, at least one catalyst component soluble in a first solvent is insoluble in a second solvent.

In an embodiment, at least one catalyst component soluble in a second solvent is insoluble in a first solvent.

In an embodiment, at least one catalyst component soluble in a first solvent is insoluble in a second solvent and the at least one catalyst component soluble in the second solvent is insoluble in the first solvent.

In an embodiment, at least one catalyst component soluble in the first solvent includes: i) an organometallic catalyst compound and ii) an ionic activator.

In an embodiment, at least one catalyst component soluble in a second solvent includes: iii) an alkylaluminoxane co-catalyst, and optionally iv) a hindered phenol.

In an embodiment, at least one catalyst component soluble in a second solvent includes: i) an organometallic catalyst compound and ii) an ionic activator.

In an embodiment, at least one catalyst component soluble in a first solvent includes: iii) an alkylaluminoxane co-catalyst, and optionally iv) a hindered phenol.

In an embodiment, a first solvent is an aromatic hydrocarbon.

In an embodiment, a second solvent is an aromatic hydrocarbon.

In an embodiment, an aromatic hydrocarbon is one or more than one xylene isomer.

In an embodiment, an aromatic hydrocarbon is ortho-xylene.

In an embodiment, a second solvent includes an alkane.

In an embodiment, a first solvent includes an alkane.

In an embodiment, an alkane is one or more than one methylpentane isomer.

In an embodiment, an alkane is 2-methylpentane.

In an embodiment, an organometallic catalyst compound is a phosphinimine catalyst compound.

In an embodiment, an ionic activator is trityl borate, $Ph_3CB(C_6F_5)_4$.

In an embodiment, an alkylaluminoxane is methylaluminoxane.

In an embodiment, an optional hindered phenol is 2,6-di-tert-butyl-p-ethylphenol, $C_{16}H_{26}O$.

An embodiment of the disclosure is an apparatus for the delivery of a multi-component olefin polymerization catalyst to a polymerization reactor, the apparatus including: a first catalyst component delivery conduit; a second catalyst component delivery conduit which is disposed within the first catalyst component delivery conduit; and an open ended catalyst component mixing conduit which terminates within the polymerization reactor; the first and second catalyst component delivery conduits each being open ended and co-terminating at the catalyst component mixing conduit; wherein at least one catalyst component soluble in a first solvent is delivered under pressure along with the first solvent to the catalyst component mixing conduit via the first catalyst component delivery conduit, and at least one catalyst component soluble in a second solvent is delivered under pressure along with the second solvent to the catalyst component mixing conduit via the second catalyst component delivery conduit, whereby the at least one catalyst component soluble in the first solvent comes into contact with the at least one catalyst component soluble in the second solvent within the catalyst component mixing conduit to form an active polymerization catalyst before being expelled from the catalyst component mixing conduit into the polymerization reactor.

In an embodiment, a second catalyst component delivery conduit is arranged substantially coaxially within a first catalyst component delivery conduit so that the open ends of the first and second catalyst component delivery conduits co-terminate in a substantially concentric arrangement at a catalyst component mixing conduit.

In an embodiment, a catalyst component mixing conduit includes a conical section in fluid communication with an open ended tubular section which terminates within a polymerization reactor, the conical section tapering inwardly to meet the open ended tubular section, wherein the conical section receives at least one catalyst component soluble in a first solvent from a first catalyst component delivery conduit and at least one catalyst component soluble in a second solvent from a second catalyst component delivery conduit.

In an embodiment, a first catalyst component delivery conduit and a second catalyst component delivery conduit are in fluid communication with at least one first catalyst component holding tank, and at least one second catalyst component holding tank, respectively.

In an embodiment, a polymerization reactor is a stirred tank reactor.

In an embodiment, a stirred tank reactor includes a bottom wall surface, a top wall surface and a continuous side wall surface extending upwardly from the bottom wall surface to the top wall surface.

In an embodiment, a catalyst component mixing conduit extends through the bottom wall surface of a stirred tank reactor.

An embodiment of the disclosure is a method for delivering a multi-component olefin polymerization catalyst to a polymerization reactor, the method including: adding a catalyst injection system to a polymerization reactor, the catalyst injection system including a first open ended catalyst component delivery conduit, a second open ended catalyst component delivery conduit arranged coaxially with and disposed within the first catalyst component delivery conduit, the open ends of the first and second catalyst component delivery conduit co-terminating in concentric arrangement at a catalyst component mixing conduit which terminates within the polymerization reactor; feeding at least one catalyst component soluble in a first solvent to the catalyst component mixing conduit via the first catalyst component delivery conduit, feeding at least one catalyst component soluble in a second solvent to the catalyst component mixing conduit via the second catalyst component delivery conduit; whereby the catalyst components come into contact with one another to form an active polymerization catalyst within the catalyst component mixing conduit before being expelled from the catalyst component mixing conduit into the polymerization reactor.

In an embodiment, a multi-component olefin polymerization catalyst includes: i) an organometallic catalyst compound, ii) an ionic activator, iii) an alkylaluminoxane co-catalyst, and optionally iv) a hindered phenol.

In an embodiment, a polymerization reactor is a solution phase polymerization reactor.

DETAILED DESCRIPTION

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "soluble" is defined as, susceptible of being dissolved in or as if in a liquid. Further, the term "soluble" with regard to a catalyst component should be taken to mean that the catalyst component can be made to dissolve completely in a solvent to which it is added given sufficient time under standard conditions of pressure and temperature. The term "insoluble" is herein defined as, incapable of being dissolved in a liquid, or soluble only with difficulty or to a slight degree.

As used herein, the term "solvent" is defined as, a substance that dissolves another to form a solution. In contrast, the term "diluent" is given a wider construction to mean a substance that dissolves another substance, or a substance that merely dilutes the concentration of a substance either in solution or in suspension with little or no appreciable solvation of the substance.

As used herein, the term "conduit" is defined as, a pipe, tube, or the like, for conveying fluid.

As used herein, the term "tube" is defined as, a hollow, usually cylindrical body of metal, glass, rubber or other material, used especially for conveying or containing liquids or gases.

As used herein, the term "co-terminating" is defined as, having a common boundary; contiguous, bordering. In particular, two conduits or tubes that are arranged one inside the other that both terminate at approximately the same planar location are said to co-terminate.

As used herein, the terms "olefin" and "monomer" refer to a small molecule including a double bond that may chemically react and become chemically bonded with itself or other olefins or monomers to form a polymer.

As used herein, the term "α-olefin" is used to describe a monomer having a linear hydrocarbon chain containing from 3 to 20 carbon atoms having a double bond at one end of the chain.

As used herein, the term "ethylene polymer" or "polyethylene", refers to macromolecules produced from ethylene monomers and optionally one or more additional monomers (e.g. α-olefins); regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. The term "copolymer" refers to a polymer that contains two or more types of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high-pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used include barrier resins (EVOH), tie resins, polyethylene terephthalate (PET), polyamides and the like.

Figure 1:
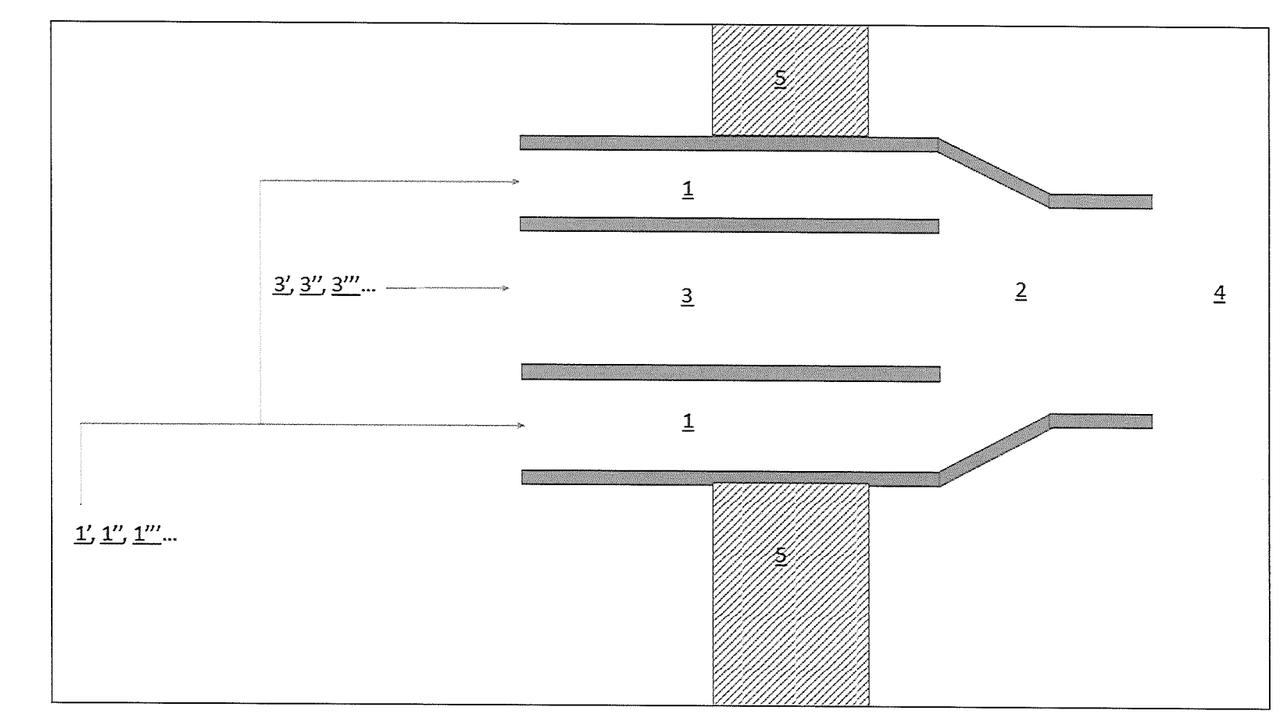
FIG. 1 shows a schematic cross-sectional illustration view of a catalyst injection apparatus that can be used for the delivery of a multi-component olefin polymerization catalyst to a polymerization reactor.

With reference to FIG. 1, in an embodiment of the disclosure, an apparatus for the delivery of a multi-component olefin polymerization catalyst to a polymerization reactor includes a first open-ended catalyst component delivery conduit, 1, and a second open-ended catalyst component delivery conduit, 3, which are arranged one within the other, such that the second catalyst component delivery conduit is disposed within the first catalyst component delivery conduit. The first catalyst component catalyst delivery conduit may be considered an "outer" catalyst component delivery conduit, while the second catalyst component delivery conduit may be considered an "inner" catalyst component delivery conduit. Each open-ended catalyst component delivery conduit (1 and 3) co-terminates at a common catalyst component mixing conduit, 2, which is also open-ended.

In an embodiment of the disclosure, at least one catalyst component (of a multi-component olefin polymerization catalyst) is soluble in a first solvent and is delivered under pressure along with the first solvent to the catalyst component mixing conduit, 2, via the first catalyst component delivery conduit, 1.

In an embodiment of the disclosure, at least one catalyst component (of a multi-component olefin polymerization catalyst) is soluble in a second solvent and is delivered under pressure along with the second solvent to the catalyst component mixing conduit, 2, via the second catalyst component delivery conduit, 3.

In an embodiment of the disclosure, the at least one catalyst component soluble in the first solvent comes into contact with the at least one catalyst component soluble in the second solvent within the catalyst component mixing conduit, 2, to form an active polymerization catalyst before being expelled from the open end of catalyst component mixing conduit, 2, into a polymerization reactor, 4.

In an embodiment of the disclosure, the at least one catalyst component soluble in the first solvent is insoluble in the second solvent.

In an embodiment of the disclosure, the at least one catalyst component soluble in the second solvent is insoluble in the first solvent.

In an embodiment of the disclosure, the at least one catalyst component soluble in the first solvent is insoluble in the second solvent and the at least one catalyst component soluble in the second solvent is insoluble in the first solvent.

Without wishing to be bound by any single theory, by separately feeding catalyst components having different solubilities to a catalyst component mixing conduit which exits into a polymerization reactor it is ensured that catalyst components do not prematurely precipitate from solution during the formation of the active polymerization catalyst. By avoiding premature precipitation, a multi component olefin polymerization catalyst can be formed in situ en route to a polymerization reactor with reduced risk of fouling of the associated catalyst component feeding systems.

The first and second catalyst components delivery conduits (the inner and outer catalyst component delivery conduits respectively) can have any suitable cross-sectional shape including for example, circular or rectilinear.

In an embodiment of the disclosure, each of the first and second catalyst component delivery conduits, 1 and 3 are tubular and have a circular or annular cross section defined by a diameter.

In an embodiment of the disclosure, and with reference to FIG. 1, the first catalyst component delivery conduit, 1, and the second catalyst component delivery conduit, 3, are arranged one within the other, with the second catalyst component delivery conduit, 3, disposed within the first catalyst component delivery conduit, 1.

In an embodiment of the disclosure, the first catalyst component delivery conduit, 1, and the second catalyst component delivery conduit, 3, are in fluid communication with at least one first catalyst component holding tank, 1', 1", 1'", etc., and at least one second catalyst component holding tank, 3', 3", 3'", etc., respectively.

In an embodiment, at least one catalyst component soluble in a first solvent, is first solubilized in a first solvent in at least one first catalyst component holding tank. The at least one catalyst component soluble in a first solvent, may then be fed under pressure in a first solvent, via a first catalyst component delivery conduit to a catalyst component mixing conduit, using any pumping means known in the art.

In an embodiment, at least one catalyst component soluble in a second solvent, is first solubilized in a second solvent in at least one second catalyst component holding tank. The at least one catalyst component soluble in a second solvent, may then be fed under pressure in a second solvent, via a second catalyst component delivery conduit to a catalyst component mixing conduit, using any pumping means known in the art.

In an embodiment of the disclosure, the first catalyst component delivery conduit, 1, and the second catalyst component delivery conduit, 3, are arranged one within the other, with each catalyst component delivery conduit terminating at a catalyst component mixing conduit, 2.

In an embodiment of the disclosure, the first catalyst component delivery conduit, 1, and the second catalyst component delivery conduit, 3, are arranged one within the other, with each catalyst component delivery conduit co-terminating at a catalyst component mixing conduit, 2. In this embodiment, the term "co-terminates" means that each catalyst component delivery conduit comes to an end in approximately the same annular plane within a common catalyst component mixing conduit.

In an embodiment of the disclosure, and with reference to FIG. 1, the first catalyst component delivery conduit, 1, and the second catalyst component delivery conduit, 3, are arranged one within the other, with the second catalyst component delivery conduit, 3, being disposed within the first catalyst component delivery conduit, 1, and in which each catalyst component delivery conduit co-terminates at a common catalyst component mixing conduit, 2. In this embodiment, the term "co-terminates" means that each catalyst component delivery conduit comes to an end in approximately the same annular plane within a common catalyst component mixing conduit.

In an embodiment of the disclosure, and with reference to FIG. 1, the first catalyst component delivery conduit, 1, and the second catalyst component delivery conduit, 3, are arranged one within the other, in a substantially coaxial arrangement so that the open ends of the first and second catalyst component delivery conduits co-terminate in a substantially concentric arrangement at the catalyst component mixing conduit, 2. In this embodiment, the term "co-terminates" means that each catalyst component delivery conduit comes to an end in approximately the same annular plane within a common catalyst component mixing conduit.

The catalyst component mixing conduit receives catalyst components, solvents and optionally diluents, from each of the first and second catalyst delivery conduits and has an interior volume in which the catalyst components can mix and react to form an active olefin polymerization catalyst prior to being expelled from the open end of the catalyst component mixing conduit into a polymerization reactor. The catalyst component mixing conduit can take the general form of a conduit having any suitable shape and dimension and which is opened ended so that catalyst component flows can come into contact with one another for a certain period of time before being expelled into the polymerization reactor from the open end of the catalyst component mixing conduit.

In some embodiments of the disclosure, the catalyst component mixing conduit is an open-ended conduit having a circular or rectilinear cross section.

The period of time within the catalyst component mixing conduit during which catalyst components fed from the first and second catalyst component delivery conduits come into contact with each and can react to form an active polymerization catalyst prior to them being expelled from the catalyst component mixing conduit may be called the "hold-up time." By way of providing a non-limiting example only, a catalyst component mixing conduit having a larger interior volume, will provide a longer hold-up time for the olefin polymerization catalyst components to mix and react, for a given flow rate of catalyst components into the catalyst component mixing conduit.

In an embodiment of the disclosure, the catalyst component mixing conduit includes a conical section in fluid communication with an open-ended tubular section which terminates within a polymerization reactor.

In an embodiment of the disclosure, the catalyst component mixing conduit includes a first tubular section in fluid communication with an open ended second tubular section which terminates within a polymerization reactor.

In an embodiment, the catalyst component mixing conduit includes a conical section in fluid communication with an open ended tubular section which terminates within the polymerization reactor, the conical section tapering inwardly to meet the open ended tubular section, wherein the conical section receives the at least one catalyst component from the first catalyst component delivery conduit and the at least one catalyst component from the second catalyst component delivery conduit.

In an embodiment of the disclosure, and with reference to FIG. 1, the catalyst component mixing conduit, 2, includes an upstream conical section in fluid communication with an open ended downstream tubular section, which terminates within a polymerization reactor, 4, with the conical section tapering inwardly to meet the open ended tubular section. The upstream end of the conical section, which is the wide end of the conical section, receives at least one catalyst component soluble in a first solvent from the first catalyst component delivery conduit, 1, and at least one catalyst component soluble in a second solvent from the second catalyst component delivery conduit, 3. The downstream end of the conical section, which is the narrow end of the conical section terminates at the open ended tubular section, which in turn terminates within the polymerization reactor. Taken together, the upstream conical section and the downstream tubular section can be considered a sort of "catalyst injection quill."

In an embodiment, the catalyst component mixing conduit includes a first tubular section having a first tubular cross section, which is in fluid communication with a second tubular section which is open ended and has a second tubular cross section which is different from the first tubular cross section.

In an embodiment, the catalyst component mixing conduit includes a first tubular section having a first annular cross section defined by a first diameter, which is in fluid communication with a second tubular section which is open ended and has a second annular cross section which is defined by a second diameter which is smaller than the first diameter.

In an embodiment, the catalyst component mixing conduit includes a first tubular section having a first annular cross section defined by a first diameter, which is in fluid communication with a second tubular section which is open ended and has a second annular cross section which is defined by a second diameter, wherein the first diameter is from 1.1 to 50 times larger than the second diameter.

In an embodiment, the catalyst component mixing conduit includes a first tubular section having a first annular cross section defined by a diameter of from 1 to 3 inches, which is in fluid communication with a second tubular section which is open ended and has a second annular cross section which is defined by a diameter of from 0.1 to 1 inches.

The polymerization reactor employed with the present disclosure can be of any type known to persons skilled in the art. Some non-limiting examples of well-known polymerization reactors include for example, fluidized bed reactors, loop reactors, and stirred tank reactors.

In an embodiment of the disclosure, the polymerization reactor is a solution phase polymerization reactor.

In an embodiment of the disclosure, the polymerization reactor is used to polymerize olefins in the solution phase.

In an embodiment of the disclosure, the polymerization reactor is used to polymerize ethylene and optionally one or more alpha-olefins in the solution phase. In an embodiment of the disclosure, the polymerization reactor is a stirred tank reactor.

In an embodiment, the polymerization reactor is a stirred tank reactor having a bottom wall defining an interior bottom wall surface, a top wall defining an interior top wall surface, and a side wall extending upwardly form the bottom wall to the top wall and defining an interior side wall surface.

In embodiments of the disclosure, the catalyst injection apparatus, may be positioned such that a portion of the first and second catalyst component delivery conduits penetrate any reactor wall.

In embodiments of the disclosure, the catalyst injection apparatus may be positioned such that a portion of the first and second catalyst component delivery conduits penetrate a reactor wall in any direction.

In embodiments of the disclosure, the catalyst injection apparatus may be positioned such that a portion of the first and second catalyst component delivery conduits penetrate a reactor wall in a substantially horizontal direction.

In embodiments of the disclosure, the catalyst injection apparatus may be positioned such that a portion of the first and second catalyst component delivery conduits penetrate a reactor wall in a substantially vertical direction.

In embodiments of the disclosure, the catalyst injection apparatus may be positioned such that a portion of the catalyst component mixing conduit penetrates any reactor wall.

In embodiments of the disclosure, the catalyst injection apparatus may be positioned such that a portion of the catalyst component mixing conduit penetrates a reactor wall in any direction.

In embodiments of the disclosure, the catalyst injection apparatus may be positioned such that a portion of the catalyst component mixing conduit penetrates a reactor wall in a substantially horizontal direction.

In embodiments of the disclosure, the catalyst injection apparatus may be positioned such that a portion of the catalyst component mixing conduit penetrates a reactor wall in a substantially vertical direction.

In embodiments of the disclosure, the catalyst injection apparatus may be positioned such that a portion of the first and second catalyst component delivery conduits penetrate a bottom wall surface of a stirred tank reactor wall.

In embodiments of the disclosure, the catalyst injection apparatus may be positioned such that a portion of the first and second catalyst component delivery conduits penetrate a reactor wall to any unspecified depth.

In alternative embodiments of the disclosure, the catalyst injection apparatus may be positioned such that a portion of the catalyst component mixing conduit penetrates a reactor wall to any unspecified depth.

In embodiments of the disclosure, the catalyst injection apparatus is positioned such that a portion of the catalyst component mixing conduit penetrates a bottom wall surface of a stirred tank reactor wall.

With reference to FIG. 1, in an embodiment of the disclosure, the apparatus is positioned such that the first and second catalyst component delivery conduits, 1 and 3, respectively, penetrate a wall, 5, of a polymerization reactor, 4, and terminate at a catalyst component mixing conduit, 2, at a location within the polymerization reactor interior, such that catalyst component mixing conduit lies entirely within the polymerization reactor interior.

In an embodiment of the disclosure, the catalyst injection apparatus is positioned such that the first and second catalyst component delivery conduits penetrate a wall of a polymerization reactor, and terminate at a catalyst component mixing conduit at a position which is substantially adjacent to or flush with an interior wall surface of a polymerization reactor, such that catalyst component mixing conduit lies substantially within or entirely within the polymerization reactor interior, respectively.

In an embodiment of the disclosure, the catalyst injection apparatus is positioned such that the first and second catalyst component delivery conduits partially penetrate a wall of a polymerization reactor, such that they terminate at a catalyst component mixing conduit which lies partially within a polymerization reactor wall but which extends to within the polymerization reactor interior.

In an embodiment of the disclosure, the catalyst injection apparatus is positioned such that the first and second catalyst component delivery conduits terminate at a catalyst component mixing conduit which itself penetrates a wall of a polymerization reactor and extends to within the polymerization reactor interior.

The Multi Component Olefin Polymerization Catalyst

The polymerization catalyst employed in the present disclosure is a multi-component olefin polymerization catalyst. The catalyst components which make up the multi-component olefin polymerization catalyst are not particularly limited, and a wide variety of catalyst components can be used, provided that they are useful for forming an active olefin polymerization catalyst.

In an embodiment of the disclosure, the multicomponent catalyst system includes at least one catalyst component which is soluble in a first solvent, and at least one catalyst component which is soluble in a second solvent.

In an embodiment of the disclosure, the multicomponent catalyst system includes at least one catalyst component which is soluble in a first solvent but insoluble in a second solvent.

In an embodiment of the disclosure, the multicomponent catalyst system includes at least one catalyst component which is soluble in a second solvent but insoluble in a first solvent.

In an embodiment of the disclosure, the multicomponent catalyst system includes at least one catalyst component which is soluble in a first solvent, but insoluble in a second solvent, and at least one catalyst component which is soluble in the second catalyst solvent, but insoluble in the first solvent.

With reference to FIG. 1, an embodiment of the disclosure is a method for delivering a multi-component olefin polymerization catalyst to a polymerization reactor, the method including: feeding at least one catalyst component soluble in a first solvent (along with the first solvent) to a catalyst component mixing conduit, 2, via a first catalyst component delivery conduit, 1; feeding at least one catalyst component soluble in a second solvent (along with the second solvent) to the catalyst component mixing conduit, 2, via a second catalyst component delivery conduit, 3, which is disposed within the first catalyst component delivery conduit; wherein the at least one catalyst component soluble in the first solvent and the at least one catalyst component soluble in the second solvent come into contact with one another within the catalyst component mixing conduit, 2, (to form an active polymerization catalyst) before being expelled from the catalyst component mixing conduit into the polymerization reactor, 4.

With reference to FIG. 1, an embodiment of the disclosure is a method for delivering a multi-component olefin polymerization catalyst to a polymerization reactor, the method including: feeding at least one catalyst component soluble in a second solvent (along with the second solvent) to a catalyst component mixing conduit, 2, via a first catalyst component delivery conduit, 1; feeding at least one catalyst component soluble in a first solvent (along with the first solvent) to the catalyst component mixing conduit, 2, via a second catalyst component delivery conduit, 3, which is disposed within the first catalyst component delivery conduit; wherein the at least one catalyst component soluble in the first solvent and the at least one catalyst component soluble in the second solvent come into contact with one another within the catalyst component mixing conduit, 2 (to form an active polymerization) catalyst before being expelled from the catalyst component mixing conduit into the polymerization reactor, 4.

With reference to FIG. 1, an embodiment of the disclosure is a method for delivering a multi-component olefin polymerization catalyst to a polymerization reactor, the method including: adding a catalyst injection apparatus to a polymerization reactor, the apparatus including a first open ended catalyst component delivery conduit, 1, a second open ended catalyst component delivery conduit, 3, arranged coaxially with and disposed within the first catalyst component delivery conduit, the open ends of the first and second catalyst component delivery conduits co-terminating in concentric arrangement at an open ended catalyst component mixing conduit, 2, which terminates within the polymerization reactor, 4; feeding at least one catalyst component soluble in a first solvent to the catalyst component mixing conduit, 2, via the first catalyst component delivery conduit, 1, feeding at least one catalyst component soluble in a second solvent to the catalyst component mixing conduit, 2, via the second catalyst component delivery conduit, 3, so that the catalyst components come into contact with one another (to form an active polymerization catalyst) within the catalyst component mixing conduit, 2, before being expelled from the open end of the catalyst component mixing conduit into the polymerization reactor, 4.

With reference to FIG. 1, an embodiment of the disclosure is a method for delivering a multi-component olefin polymerization catalyst to a polymerization reactor, the method including: adding a catalyst injection apparatus to a polymerization reactor, the apparatus including a first open ended catalyst component delivery conduit, 1, a second open ended catalyst component delivery conduit, 3, arranged coaxially with and disposed within the first catalyst component delivery conduit, the open ends of the first and second catalyst component delivery conduits co-terminating in concentric arrangement at an open ended catalyst component mixing conduit, 2, which terminates within the polymerization reactor, 4; feeding at least one catalyst component soluble in a first solvent to the catalyst component mixing conduit, 2, via the first catalyst component delivery conduit, 1, feeding at least one catalyst component soluble in a second solvent to the catalyst component mixing conduit, 2, via the second catalyst component delivery conduit, 3; and providing a hold up time during which the catalyst components come into contact with one another to form an active polymerization catalyst within the catalyst component mixing conduit, 2, before being expelled from the open end of catalyst component mixing conduit into the polymerization reactor, 4.

In an embodiment of the disclosure, a multi-component olefin polymerization catalyst includes the following catalyst components: (i) an organometallic catalyst compound; (ii) an ionic activator; (iii) an alkylaluminoxane co-catalyst; and, optionally, (iv) a hindered phenol.

Suitable organometallic catalyst compounds include metallocene catalysts, constrained geometry catalysts and phosphinimine catalysts all of which are well known to persons skilled in the relevant art. Some non-limiting examples of metallocene catalysts can be found in U.S. Pat. Nos. 4,701,432; 4,808,561; 4,935,397; 4,937,301; 5,324,800; 5,633,394; 6,002,033 and 6,489,413, which are incorporated herein by reference. Some non-limiting examples of constrained geometry catalysts can be found in U.S. Pat. Nos. 5,057,475; 5,064,802; 5,096,867; 5,132,380; 5,703,187 and 6,034,021, all of which are incorporated by reference herein in their entirety. Some non-limiting examples of phosphinimine catalysts can be found in U.S. Pat. Nos. 6,063,879; 6,235,672; 6,277,931; 6,342,463; 6,372,864; 6,777,509; 6,984,695 and 8,431,657 all of which are incorporated by reference herein.

In an embodiment, the organometallic catalyst compound is based on a group 3, 4 or 5 metal (where the numbers refer to columns in the Periodic Table of the Elements using IUPAC nomenclature).

In another embodiment, the organometallic catalyst compound is based on a metal from group 4, which includes titanium, hafnium and zirconium. In a specific embodiment, an organometallic catalyst compound is a group 4 metal complex in its highest oxidation state.

Polymerization catalysts, such as the organometallic catalyst compounds described herein, usually require activation by one or more activator and/or cocatalytic species in order to provide polymer. Hence, suitable organometallic catalyst compounds are sometimes called "pre-catalysts."

Particularly suitable for high temperature solution polymerization processes are phosphinimine catalyst compounds which are further described below. A phosphinimine catalyst compound is an organometallic compound based on a group 3, 4 or 5 metal and which is characterized as having at least one phosphinimine ligand. Any organometallic compounds/complexes having a phosphinimine ligand and which display catalytic activity for ethylene copolymerization are contemplated for use in the current disclosure.

In an embodiment of the disclosure, an organometallic catalyst compound is a phosphinimine catalyst compound.

In an embodiment of the disclosure, a phosphinimine catalyst compound has the formula (I):

$$(L^A)_a M(PI)_b (Q)_n \qquad (I)$$

wherein $(L^A)$ represents a bulky ligand; M represents a metal atom; PI represents a phosphinimine ligand; Q represents a leaving group; a is 0 or 1; b is 1 or 2; (a+b)=2; n is 1 or 2; and the sum of (a+b+n) equals the valance of the metal M.

Non-limiting examples of the bulky ligand $L^A$ in formula (I) include unsubstituted or substituted cyclopentadienyl (i.e. "Cp") ligands or cyclopentadienyl-type ligands, and, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of q-bonding to the metal M, such embodiments include both $\eta^3$-bonding and $\eta^5$-bonding to the metal M. In other embodiments, $L^A$ may include one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles. Non-limiting examples of metal M in formula (I) include Group 4 metals, titanium, zirconium and hafnium.

The phosphinimine ligand, PI, is defined by formula (II):

$$(R^P)_3P=N- \qquad (II)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula $-Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula $-Ge(R^G)_3$, wherein the $R^G$ groups are defined as $R^s$ is defined in this paragraph.

In an embodiment, each $R^P$ is a tert-butyl group.

The leaving group Q is any ligand that can be abstracted from formula (I) forming a catalyst species capable of polymerizing one or more olefin(s). An equivalent term for Q is an "activatable ligand," i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ aryl or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

The number of activatable ligands Q depends upon the valency of the metal and the valency of the activatable ligand. In some embodiments, the preferred organometallic catalysts are based on group 4 metals in their highest oxidation state (i.e., 4+). In an embodiment of the disclosure, activatable ligands, Q are monoanionic such as a halide (e.g., chloride) or an alkyl (e.g., methyl, benzyl).

In some instances, the metal of the organometallic catalyst component may not be in the highest oxidation state. For example, a titanium (III) component would contain only one activatable ligand.

In general, ionic activators are included of a cation and a bulky anion; wherein the latter is substantially non-coordinating. See, for example, U.S. Pat. Nos. 5,198,401 and 5,132,380. Non-limiting examples of ionic activators are boron ionic activators that are four coordinate with four ligands bonded to the boron atom. Non-limiting examples of boron ionic activators include the following formulas (III) and (IV) shown below;

$$[R^5]^+[B(R^7)_4]^- \qquad (III)$$

where B represents a boron atom, $R^5$ is an aromatic hydrocarbyl (e.g., triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula $-Si(R^9)_3$, where each $R^9$ is independently selected from hydrogen atoms and $C_{1-4}$ alkyl radicals, and; compounds of formula (IV);

$$[(R^8)_tZH]^+[B(R^7)_4]^- \qquad (IV)$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In embodiments of the disclosure, in the above compounds (III) and (IV), $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom (i.e. where Z=N) forms an anilinium radical which is substituted by two $C_{1-4}$ alkyl radicals.

In both formula (III) and (IV), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

Without wishing to be bound by theory, ionic activators include activators that activate the organometallic complex by protonolysis of a suitable activatable ligand or by the electrophilic abstraction of a suitable activatable ligand. Although the "ionic activator" may abstract or cleave one or more activatable ligand so as to ionize the catalyst center into a "cation", it does not covalently bond with the catalyst, providing instead, sufficient distance between the catalyst metal center and the ionizing activator to permit a polymerizable olefin to enter the resulting active site. The "ionic activator" may abstract one or more activatable ligands so as to ionize the organometallic catalyst center into a cation but not to covalently bond with the catalyst and to provide sufficient distance between the catalyst and the ionizing activator to permit a polymerizable olefin to enter the resulting active site.

Although the exact structure of the alkylaluminoxane co-catalyst is uncertain, subject matter experts generally agree that it is an oligomeric species that contain repeating units of the general formula (V):

$(R)_2AlO—(Al(R)—O)_n—Al(R)_2$ (V)

where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group in formula (V) is a methyl radical.

Well known, commercially available alkylaluminoxanes include methylaluminoxane (or "MAO") in which each R is methyl and modified methylaluminoxane ("MMAO") in which each R is mainly methyl, but is also a longer chain alkyl in smaller amounts, which helps to improve solubility in hydrocarbon solvents.

The use of an alkylaluminoxane co-catalyst generally requires an excess molar ratio of aluminum to the transition metal in the organometallic catalyst. Ratios of from 5:1 to 1000:1 may be used. In an embodiment of the disclosure, the molar ratio used is from about 20:1 to about 250:1.

Non-limiting example of hindered phenols include butylated phenolic, antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

In an embodiment of the disclosure, the organometallic catalyst compound, component (i), is a phosphinimine catalyst compound, and is insoluble in an alkane, but is soluble in an aromatic hydrocarbon. In a further embodiment, the phosphinimine catalyst compound is soluble in one or more than one xylene isomer. In a further embodiment, the phosphinimine catalyst compound is soluble in ortho-xylene.

In an embodiment of the disclosure, the ionic activator, component (ii), is an ionic activator such as trityl borate, and is insoluble in an alkane, but is soluble in an aromatic hydrocarbon. In a further embodiment, the ionic activator is soluble in one or more than one xylene isomer. In a further embodiment, the ionic activator is soluble in ortho-xylene.

In an embodiment of the disclosure, the alkylaluminoxane co-catalyst, component (iii), is soluble in a solvent including both an alkane and an aromatic hydrocarbon. In a further embodiment, the alkylaluminoxane co-catalyst is methylaluminoxane and is soluble in a solvent including 2-methylpentane.

In an embodiment of the disclosure, the optional hindered phenol, component (iv), is soluble in a solvent including both an alkane and an aromatic hydrocarbon. In a further embodiment, the hindered phenol is 2,6-di-tert-butyl-p-ethylphenol and is soluble in a solvent including 2-methylpentane.

In an embodiment of the disclosure, at least one catalyst component soluble in a first solvent is insoluble in a second solvent and the at least one catalyst component soluble in the second solvent is insoluble in the first solvent.

In an embodiment of the disclosure, at least one catalyst component soluble in a first solvent is insoluble in a second solvent.

In an embodiment of the disclosure, at least one catalyst component soluble in the second solvent is insoluble in the first solvent.

In an embodiment of the disclosure, the at least one catalyst component soluble in a first solvent includes: i) an organometallic catalyst compound and ii) an ionic activator.

In an embodiment of the disclosure, the at least one catalyst component soluble in a second solvent includes: iii) an alkylaluminoxane co-catalyst, and optionally iv) a hindered phenol.

In an embodiment of the disclosure, the at least one catalyst component soluble in a second solvent includes: i) an organometallic catalyst compound and ii) an ionic activator.

In an embodiment of the disclosure, the at least one catalyst component soluble in a first solvent includes: iii) an alkylaluminoxane co-catalyst, and optionally iv) a hindered phenol.

In an embodiment of the disclosure, the first solvent is an aromatic hydrocarbon solvent.

In an embodiment of the disclosure, the second solvent is an aromatic hydrocarbon solvent.

In an embodiment of the disclosure, the first solvent includes an alkane solvent.

In an embodiment of the disclosure, the second solvent includes an alkane solvent.

In embodiments of the disclosure, an aromatic hydrocarbon solvent may be selected from the group including benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

In an embodiment of the disclosure, the aromatic hydrocarbon solvent is one or more than one xylene isomer. In an embodiment, the aromatic hydrocarbon solvent is ortho-xylene.

In embodiments of the disclosure, an alkane solvent may be a linear, branched or cyclic $C_5$ to $C_{20}$ alkane or mixture thereof. In embodiments of the disclosure, the alkane solvent may be selected from linear, branched or cyclic $C_{5-12}$ aliphatic hydrocarbons, such as pentane, methyl pentane, hexane, heptane, octane, cyclohexane, methylcyclohexane, ISOPAR® E, hydrogenated naphtha or combinations thereof.

In an embodiment of the disclosure, the alkane solvent is one or more than one methylpentane isomer. In an embodiment, the alkane solvent is 2-methylpentane.

In an embodiment of the disclosure, the at least one catalyst component soluble in the first solvent includes: i) a phosphinimine catalyst compound and ii) an ionic activator.

In an embodiment of the disclosure, the at least one catalyst component soluble in the first solvent includes: i) a phosphinimine catalyst compound and ii) trityl borate, $Ph_3CB(C_6F_5)_4$.

In an embodiment of the disclosure, the at least one catalyst component soluble in the first solvent includes: i) a phosphinimine catalyst compound and ii) an ionic activator and the first solvent is an aromatic hydrocarbon.

In an embodiment of the disclosure, the at least one catalyst component soluble in the first solvent includes: i) a phosphinimine catalyst compound and ii) trityl borate, $Ph_3CB(C_6F_5)_4$ and the first solvent is an aromatic hydrocarbon.

In an embodiment of the disclosure, the at least one catalyst component soluble in the second solvent includes: i) a phosphinimine catalyst compound and ii) an ionic activator.

In an embodiment of the disclosure, the at least one catalyst component soluble in the second solvent includes: i) a phosphinimine catalyst compound and ii) trityl borate, $Ph_3CB(C_6F_5)_4$.

In an embodiment of the disclosure, the at least one catalyst component soluble in the second solvent includes: i) a phosphinimine catalyst compound and ii) an ionic activator and the second solvent is an aromatic hydrocarbon.

In an embodiment of the disclosure, the at least one catalyst component soluble in the second solvent includes: i) a phosphinimine catalyst compound and ii) trityl borate, $Ph_3CB(C_6F_5)_4$ and the second solvent is an aromatic hydrocarbon.

In an embodiment of the disclosure, the at least one catalyst component soluble in the second solvent includes: iii) an alkylaluminoxane co-catalyst, and optionally iv) a hindered phenol.

In an embodiment of the disclosure, the at least one catalyst component soluble in the second solvent includes: iii) a methylaluminoxane co-catalyst, and optionally iv) a hindered phenol.

In an embodiment of the disclosure, the at least one catalyst component soluble in the second solvent includes: iii) an alkylaluminoxane co-catalyst, and optionally iv) a hindered phenol and the second solvent includes an alkane.

In an embodiment of the disclosure, the at least one catalyst component soluble in the second solvent includes: iii) a methylaluminoxane co-catalyst, and optionally iv) a hindered phenol and the second solvent includes an alkane.

In an embodiment of the disclosure, the at least one catalyst component soluble in the first solvent includes: iii) an alkylaluminoxane co-catalyst, and optionally iv) a hindered phenol.

In an embodiment of the disclosure, the at least one catalyst component soluble in the first solvent includes: iii) a methylaluminoxane co-catalyst, and optionally iv) a hindered phenol.

In an embodiment of the disclosure, the at least one catalyst component soluble in the first solvent includes: iii) an alkylaluminoxane co-catalyst, and optionally iv) a hindered phenol and the first solvent includes an alkane.

In an embodiment of the disclosure, the at least one catalyst component soluble in the second solvent includes: iii) a methylaluminoxane co-catalyst, and optionally iv) a hindered phenol and the first solvent includes an alkane.

In an embodiment of the disclosure, the polymerization takes place in a solution phase reactor in which the solvent is an alkane. In a further embodiment, the solvent in the polymerization reactor is 2-methylpentane.

The process and apparatus of the present disclosure may be usefully employed in dual reactor systems, such as in-series dual reactor systems. For example, dual reactor systems which include slurry phase polymerization reactor systems, solution phase polymerization reactor systems and combinations thereof may be employed with the current process and apparatus of the present disclosure. Gas phase or slurry phase polymerization reactor systems may also be used with the process and apparatus of the current disclosure.

Slurry polymerization is well known in the art. The polymerization is conducted in an inert diluent in which the resulting polymer is not soluble. The monomers may be soluble in the diluent. The diluent is typically a hydrocarbyl compound such as a $C_{5-12}$ hydrocarbon that may be unsubstituted or substituted by a $C_{1-4}$ alkyl radical. Some potential diluents include pentane, hexane, heptane, octane, isobutene cyclohexane and methylcyclohexane. The diluent may be hydrogenated naphtha. The diluent may also be a $C_{8-12}$ aromatic hydrocarbon such as that sold by ExxonMobil Chemical under the trademark ISOPAR® E. Typically, monomers are dispersed or dissolved in the diluent. The polymerization reaction takes place at temperatures from about 20° C. to about 120° C., such as from about 40° C. to 100° C. The pressure in the reactor may be from about 15 psi to about 4,500 psi, such as from about 100 psi to 1,500 psi. The reactors may be stirred tank or "loop" reactors with a settling leg to remove product polymer. Stirred tank reactors may also be used. The solids content of the suspension is generally in the range from 10% to 80%. The polymerization can be carried out either batchwise, e.g., in stirring autoclaves, or continuously, e.g., in tube reactors, or in loop reactors.

In gas phase polymerization, pressures can be in the range of 25 psi to 1000 psi, such as 50 psi to 500 psi, or from 100 psi to 450 psi, and temperatures will be in the range of from 30° C. to 130° C., such as 65° C. to 115° C. Stirred or fluidized bed gas phase reactors can be used. In the gas phase fluidized bed polymerization of olefins, the polymerization is conducted in a fluidized bed reactor wherein a bed of polymer particles are maintained in a fluidized state by means of an ascending gas stream including the gaseous reaction monomer. The polymerization of olefins in a stirred bed reactor differs from polymerization in a gas fluidized bed reactor by the action of a mechanical stirrer within the reaction zone that contributes to fluidization of the bed. The gas phase polymerization may be conducted in dry mode, condensed mode or super condensed mode, all of which are well known in the art. Polymerization may take place in the presence of a non-polymerizable gas that may be inert or may be an alkane, or a mixture thereof and typically hydrogen. For a detailed description of gas phase fluidized bed polymerization processes see U.S. Pat. Nos. 4,543,399; 4,588,790; 5,028,670; 5,352,749 and 5,405,922.

In an embodiment, polymerization takes place in two reactors which are configured in-series. The reactors can be the same or different. For example, the reactors can each be continuously stirred tank reactors suitable for solution polymerization. The reactors can be operated under common or different conditions. For example, the reactors can be operated under conditions which promote the formation of a high molecular weight polymer fraction in a first (i.e. upstream) reactor and the formation of a low molecular weight polymer fraction in a second (i.e. downstream) reactor which receives an effluent stream from the first reactor.

Solution polymerization processes for the polymerization or copolymerization of ethylene are well known in the art (see for example U.S. Pat. Nos. 6,372,864 and 6,777,508). These processes are conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available is "ISOPAR® E" ($C_{8-12}$ aliphatic solvent, ExxonMobil Chemical). Suitable monomers for copolymerization with ethylene include $C_{3-20}$ mono- and di-olefins. In some embodiments, comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents chosen from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g., 5-methylene-2-norbornene and 5-ethylidene-2-norbornene, bicyclo-(2,2,1)-hepta-2,5-diene).

For an in-series solution phase dual reactor system, is it generally desirable to operate the second reactor, which may be immediately upstream of a devolatilization system, at higher temperature than the first reactor, since the temperature of the polymerization reaction can be used to help flash off the reaction solvent. For a given catalyst system, a temperature difference between the first and second reactors can influence the molecular weight distribution (MWD) of the final polymer, with larger temperature differences favoring increased MWD.

In solution polymerization, the monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g., methyl pentane, cyclohexane, hexane or toluene) is can be treated in a similar manner.

The feedstock may be heated or cooled prior to feeding to the first reactor. Additional monomers and solvent may be added to the second reactor, and it may be heated or cooled.

While the operating temperatures used in each reactor will vary widely depending on multiple factors such as for example the monomer concentration, the comonomer concentration, the catalyst type and concentration, the solvent used, pressure, equipment design, flow rates, the desired product properties and the like, the first reactor is generally operated at a temperature of between 80° C. and 200° C., while the second reactor is generally operated at a temperature of between 100° C. and 250° C.

In a solution polymerization process, the reaction process can be a "medium pressure process," meaning that the pressure in each reactor can be less than about 6,000 psi (about 42,000 kilopascals or kPa), such as from about 2,000 psi to 3,000 psi (about 14,000 kPa-22,000 kPa).

The residence time in each reactor will depend on the design and the capacity of the particular reactor. Generally, the reactors should be operated under conditions to achieve a thorough mixing of the reactants. In addition, from 20 weight % to 60 weight % of the final polymer can be polymerized in the first reactor, with the balance being polymerized in the second reactor. On leaving the reactor system the solvent is removed and the resulting polymer is finished in a conventional manner.

In an embodiment of the disclosure, the first polymerization reactor has a smaller volume than the second polymerization reactor.

In an embodiment of the disclosure, the first polymerization reactor is operated at a lower temperature than the second reactor.

The method and apparatus of the present disclosure may be used to prepare homopolymers of ethylene and copolymers of ethylene and higher alpha-olefins having densities in the range of, for example, about 0.900-0.970 $g/cm^3$ and especially 0.910-0.930 $g/cm^3$. Such polymers may have a melt index, as measured by the method of ASTM D-1238, condition E, in the range of, for example, about 0.1-200 dg/min. The polymers may be manufactured with narrow or broad molecular weight distribution.

The polymers produced using the method and apparatus of the present disclosure are capable of being fabricated into a wide variety of articles, as is known for homopolymers of ethylene and copolymers of ethylene and higher alpha-olefins.

EXAMPLE

A multi component catalyst formulation was made from the following four components, which were mixed together to form an active olefin polymerization catalyst in a solution phase polymerization reactor: (i) CpTiN=P(tBu)$_3$Cl$_2$ (dissolved in ortho-xylene), (ii) Ph$_3$CB(C$_6$F$_5$)$_4$ (dissolved in ortho-xylene), (iii) MMAO-7 (dissolved in ISOPAR® E+2-methylpentane), and (iv) 2,6-Di-t-butyl-4-ethylphenol (dissolved in ortho-xylene+2-methylpentane).

The catalyst components, (i) CpTiN=P(tBu)$_3$Cl$_2$ and (ii) Ph$_3$CB(C$_6$F$_5$)$_4$ have essentially no solubility in the polymerization process solvent (2-methylpentane) and so were dissolved in an aromatic solvent, ortho-xylene. As such, the catalyst components dissolved in the aromatic solvent should not contact the polymerization process solvent outside of the reactor, or the low solubility of these components in 2-methylpentane could result in catalyst component precipitation. Premature precipitation of catalyst components within the catalyst injection apparatus, may result in plugging of the apparatus, or poor control of the catalyst component molar ratios. Notwithstanding the forgoing, it may not be desirable to have all catalyst components dissolved in an aromatic solvent such as ortho-xylene for environmental and cost reasons. Also, solvent systems which lead to low flow rates of the active polymerization catalyst into the polymerization reactor could negatively impact the mixing of the active polymerization catalyst with the bulk contents of the polymerization reactor. In order to overcome these issues, a catalyst injection apparatus was employed using the following general conditions:

With reference to FIG. 1, catalyst component (i) CpTiN=P(tBu)$_3$Cl$_2$ was dissolved in ortho-xylene at the desired molar ratio and pumped through a catalyst component delivery conduit, 3 to a catalyst component mixing conduit, 2 from a catalyst component holding tank 3'. Catalyst component (ii) Ph$_3$CB(C$_6$F$_5$)$_4$ was dissolved in ortho-xylene at the desired molar ratio and pumped through the catalyst component delivery conduit, 3 to the catalyst component mixing conduit, 2 from catalyst component holding tank 3". Optionally there may also be a flow of pure ortho-xylene through the catalyst component delivery conduit, 3 to the catalyst component mixing conduit, 2 from a holding tank 3'''. The catalyst components (i) and (ii) mixed in-line within the catalyst component delivery conduit, 3 and flowed through conduit 3 to the catalyst component mixing conduit, 2. The catalyst component (iii) MMAO-7 was dissolved in a mixture of ISOPAR® E and 2-methylpentane at the desired molar ratio and pumped through a catalyst component delivery conduit, 1 to the catalyst component mixing conduit, 2 from a catalyst component holding tank 1'. Optionally catalyst component (iv) 2,6-Di-t-butyl-4-ethylphenol was dissolved in ortho-xylene and 2-methylpentane at the desired molar ratio and pumped through the catalyst component delivery conduit, 1 to the catalyst component mixing conduit, 2 from a catalyst component holding tank 1". Optionally there may also be a flow of pure 2-methylpentane through the catalyst component delivery conduit, 1 to the catalyst component mixing conduit, 2 from a holding tank 1'". The catalyst components (iii) and (iv) mixed in-line within the catalyst component delivery conduit, 1 and flowed through conduit 1 to the catalyst component mixing conduit, 2.

With reference to FIG. 1, in the catalyst component mixing conduit, 2, all of the catalyst components (i), (ii), (iii) and optional (iv), came together to form an active olefin polymerization catalyst before being expelled from the open end of catalyst component mixing conduit, 2, into the polymerization reactor, 4.

The catalyst component flow rates in the various solvent streams were of sufficiently high velocity to ensure that the catalyst component streams exiting from the open end of the catalyst component mixing conduit, 2 penetrated into the polymerization reactor interior and mixing zone.

Use of the present catalyst injection apparatus avoided contact between catalyst components dissolved in ortho-xylene (components (i) and (ii)) and those dissolved in a solvent including 2-methylpentane (component (iii) and (iv)) thereby preventing precipitation of catalyst components (i) and (ii) upstream of the polymerization reactor, while allowing the active polymerization catalyst to form in-situ, at high dilution and high temperature (e.g. under the polymerization reaction conditions) where solubility is no longer a concern.

What is claimed is:

1. A method for delivering a multi-component olefin polymerization catalyst to a polymerization reactor, the method comprising:
   feeding at least one catalyst component soluble in a first solvent to a catalyst component mixing conduit via a first catalyst component delivery conduit;
   feeding at least one catalyst component soluble in a second solvent to the catalyst component mixing conduit via a second catalyst component delivery conduit which is disposed within the first catalyst component delivery conduit;
   wherein the at least one catalyst component soluble in the first solvent and the at least one catalyst component soluble in the second solvent come into contact with one another within the catalyst component mixing conduit before being expelled from the catalyst component mixing conduit into the polymerization reactor.

2. The method of claim 1, wherein the at least one catalyst component soluble in the first solvent is insoluble in the second solvent.

3. The method of claim 1, wherein the at least one catalyst component soluble in the second solvent is insoluble in the first solvent.

4. The method of claim 1, wherein the at least one catalyst component soluble in the first solvent is insoluble in the second solvent and the at least one catalyst component soluble in the second solvent is insoluble in the first solvent.

5. The method of claim 1, wherein the at least one catalyst component soluble in the first solvent comprises: an organometallic catalyst compound and an ionic activator.

6. The method of claim 1, wherein the at least one catalyst component soluble in the second solvent comprises: an alkylaluminoxane co-catalyst, and optionally a hindered phenol.

7. The method of claim 1, wherein the at least one catalyst component soluble in the second solvent comprises: an organometallic catalyst compound and an ionic activator.

8. The method of claim 1, wherein the at least one catalyst component soluble in the first solvent comprises: an alkylaluminoxane co-catalyst, and optionally a hindered phenol.

9. The method of claim 5, wherein the first solvent is an aromatic hydrocarbon.

10. The method of claim 7, wherein the second solvent is an aromatic hydrocarbon.

11. The method of claim 9, wherein the aromatic hydrocarbon is one or more than one xylene isomer.

12. The method of claim 9, wherein the aromatic hydrocarbon is ortho-xylene.

13. The method of claim 6, wherein the second solvent comprises an alkane.

14. The method of claim 8, wherein the first solvent comprises an alkane.

15. The method of claim 13, wherein the alkane is one or more than one methylpentane isomer.

16. The method of claim 13, wherein the alkane is 2-methylpentane.

17. The method of claim 5, wherein the organometallic catalyst compound is a phosphinimine catalyst compound.

18. The method of claim 5, wherein the ionic activator is trityl borate, $Ph_3CB(C_6F_5)_4$.

19. The method of claim 6, wherein the alkylaluminoxane co-catalyst is methylaluminoxane.

20. The method of claim 6, wherein the optional hindered phenol is 2,6-di-tert-butyl-p-ethylphenol.

21. The method of claim 1 wherein the multi-component olefin polymerization catalyst comprises: an organometallic catalyst compound, an ionic activator, an alkylaluminoxane co-catalyst, and optionally a hindered phenol.

22. The method of claim 1, wherein the polymerization reactor is a solution phase polymerization reactor.

23. A catalyst injection apparatus for the delivery of a multi-component olefin polymerization catalyst to a polymerization reactor, the apparatus comprising:
   a first catalyst component delivery conduit;
   a second catalyst component delivery conduit which is disposed within the first catalyst component delivery conduit; and
   an open-ended catalyst component mixing conduit which terminates within the polymerization reactor;
   the first and second catalyst component delivery conduits each being open-ended and co-terminating at the catalyst component mixing conduit;
   wherein at least one catalyst component soluble in a first solvent is delivered under pressure along with the first solvent to the catalyst component mixing conduit via the first catalyst component delivery conduit, and at least one catalyst component soluble in a second solvent is delivered under pressure along with the second solvent to the catalyst component mixing conduit via the second catalyst component delivery conduit, whereby the at least one catalyst component soluble in the first solvent comes into contact with the at least one catalyst component soluble in the second solvent within the catalyst component mixing conduit before being expelled from the catalyst component mixing conduit into the polymerization reactor.

24. The apparatus of claim 23, wherein the second catalyst component delivery conduit is arranged substantially coaxially within the first catalyst component delivery conduit so that the open ends of the first and second catalyst component delivery conduits co-terminate in a substantially concentric arrangement at the catalyst component mixing conduit.

25. The apparatus of claim 24, wherein the catalyst component mixing conduit comprises a conical section in fluid communication with an open ended tubular section which terminates within the polymerization reactor, the conical section tapering inwardly to meet the open ended tubular section, wherein the conical section receives the at least one catalyst component soluble in the first solvent from the first catalyst component delivery conduit and the at least one catalyst component soluble in the second solvent from the second catalyst component delivery conduit.

26. The apparatus of claim 25, wherein the first catalyst component delivery conduit and the second catalyst component delivery conduit are in fluid communication with at least one first catalyst component holding tank, and at least one second catalyst component holding tank, respectively.

27. The apparatus of claim 25, wherein the polymerization reactor is a stirred tank reactor.

28. The apparatus of claim 27, wherein the stirred tank reactor comprises a bottom wall, a top wall and a continuous side wall extending upwardly from the bottom wall to the top wall.

29. The apparatus of claim 28, wherein the catalyst component mixing conduit extends through the bottom wall of the stirred tank reactor.

30. A method for delivering a multi-component olefin polymerization catalyst to a polymerization reactor, the method comprising:

adding a catalyst injection apparatus to a polymerization reactor, the catalyst injection apparatus comprising a first open ended catalyst component delivery conduit, a second open ended catalyst component delivery conduit arranged coaxially with and disposed within the first catalyst component delivery conduit, the open ends of the first and second catalyst component delivery conduit co-terminating in concentric arrangement at an open-ended catalyst component mixing conduit which terminates within the polymerization reactor;

feeding at least one catalyst component soluble in a first solvent to the catalyst component mixing conduit via the first catalyst component delivery conduit;

feeding at least one catalyst component soluble in a second solvent to the catalyst component mixing conduit via the second catalyst component delivery conduit;

whereby the catalyst components come into contact with one another within the catalyst component mixing conduit before being expelled from the catalyst component mixing conduit into the polymerization reactor.

31. The method of claim 30, wherein the multi-component olefin polymerization catalyst comprises: an organometallic catalyst compound, an ionic activator, an alkylaluminoxane co-catalyst, and optionally a hindered phenol.

32. The method of claim 30, wherein the polymerization reactor is a solution phase polymerization reactor.

* * * * *